(12) United States Patent  
Adamson et al.

(10) Patent No.: US 8,936,775 B2  
(45) Date of Patent: Jan. 20, 2015

(54) CATHODE ACTIVE MATERIAL (HIGHER OXIDES OF SILVER)

(75) Inventors: George William Adamson, Camarillo, CA (US); Hongxia Zhou, Ann Arbor, MI (US); Kyunghee Cho, Ventura, CA (US)

(73) Assignee: ZPower, LLC, Camarillo, CA (US)

( * ) Notice: Subject to any disclaimer, the term of this patent is extended or adjusted under 35 U.S.C. 154(b) by 936 days.

(21) Appl. No.: 13/126,817

(22) PCT Filed: Oct. 29, 2009

(86) PCT No.: PCT/US2009/062516  
§ 371 (c)(1),  
(2), (4) Date: Jun. 14, 2011

(87) PCT Pub. No.: WO2010/051356  
PCT Pub. Date: May 6, 2010

(65) Prior Publication Data

US 2011/0286912 A1    Nov. 24, 2011

Related U.S. Application Data

(60) Provisional application No. 61/109,312, filed on Oct. 29, 2008.

(51) Int. Cl.
- *C01G 5/00* (2006.01)
- *H01M 4/54* (2006.01)
- *H01M 6/04* (2006.01)
- *H01M 10/24* (2006.01)

(52) U.S. Cl.
CPC . *C01G 5/00* (2013.01); *H01M 4/54* (2013.01); *C01P 2002/72* (2013.01); *C01P 2002/88* (2013.01); *C01P 2004/51* (2013.01); *C01P 2006/40* (2013.01); *H01M 6/04* (2013.01); *H01M 10/24* (2013.01)
USPC ........................................... 423/604

(58) Field of Classification Search
None
See application file for complete search history.

(56) References Cited

U.S. PATENT DOCUMENTS

| | | | |
|---|---|---|---|
| 2,528,891 A * | 11/1950 | Lawson | 429/207 |
| 3,017,448 A | 1/1962 | Cahan | |
| 3,954,501 A | 5/1976 | Rampel | |
| 4,056,664 A | 11/1977 | Jaffe | |
| 4,167,609 A | 9/1979 | Scarr | |
| 4,298,506 A | 11/1981 | Przybyla et al. | |
| 4,327,157 A | 4/1982 | Himy et al. | |
| 4,407,915 A | 10/1983 | Brown | |
| 4,465,747 A | 8/1984 | Evans | |
| 4,520,087 A | 5/1985 | Kamata et al. | |
| 4,835,077 A | 5/1989 | Megahed et al. | |
| 5,204,195 A | 4/1993 | Tomantschger et al. | |
| 5,336,384 A | 8/1994 | Tsou et al. | |
| 5,389,469 A | 2/1995 | Passaniti et al. | |
| 5,585,208 A | 12/1996 | Lian et al. | |
| 5,589,109 A | 12/1996 | Passaniti et al. | |
| 5,599,644 A | 2/1997 | Swierbut et al. | |
| 5,731,105 A | 3/1998 | Fleischer et al. | |
| 6,001,508 A | 12/1999 | Passaniti et al. | |
| 6,277,169 B1 | 8/2001 | Hampden-Smith et al. | |
| 6,287,432 B1 | 9/2001 | Mazanec et al. | |
| 6,337,160 B1 | 1/2002 | Hilarius et al. | |
| 2003/0207173 A1 | 11/2003 | Wang et al. | |
| 2003/0215712 A1 | 11/2003 | Feddrix et al. | |
| 2004/0058235 A1 * | 3/2004 | Huang et al. | 429/164 |
| 2004/0202926 A1 | 10/2004 | Clarke et al. | |
| 2005/0074394 A1 * | 4/2005 | Berube et al. | 423/604 |
| 2006/0147809 A1 | 7/2006 | Amine et al. | |
| 2008/0038630 A1 | 2/2008 | Cheiky | |
| 2013/0071744 A1 | 3/2013 | Zhou et al. | |
| 2013/0216901 A1 | 8/2013 | Ortega et al. | |
| 2013/0230774 A1 | 9/2013 | Ortega et al. | |
| 2014/0227591 A1 | 8/2014 | Adamson et al. | |

FOREIGN PATENT DOCUMENTS

| | | |
|---|---|---|
| DE | 2813149 | 9/1979 |
| EP | 1324408 | 7/2003 |
| GB | 2019079 | 10/1979 |
| JP | 56-149771 | 11/1981 |
| JP | 59-132567 | 7/1984 |
| JP | 60-189164 | 9/1985 |
| WO | 2006/104633 | 10/2006 |
| WO | 2008/004105 | 1/2008 |
| WO | 2011/056813 | 5/2011 |
| WO | 2011/111567 | 9/2011 |
| WO | 2012/040298 | 3/2012 |
| WO | 2012/061449 | 5/2012 |
| WO | 2014/052533 | 4/2014 |

OTHER PUBLICATIONS

Dallenbach, R., et al.: "Synthesis of silver (II) oxide by oxidation of silver or silver oxide by means of ozone", Jan. 1, 1982, Polyhendron, Pergamon Press, Oxford, GB, pp. 183-186.

International Search Report for PCT/US2006/007332 dated Jul. 31, 2007.

(Continued)

*Primary Examiner* — Melvin C Mayes  
*Assistant Examiner* — Douglas Call  
(74) *Attorney, Agent, or Firm* — Honigman Miller Schwartz and Cohn LLP; Andrew N. Weber; Jonathan P. O'Brien

(57) ABSTRACT

The present invention provides novel cathodes having a reduced resistivity and electrochemical cells using these cathodes. Furthermore, this invention also presents methods of manufacturing novel electrochemical cells and novel cathodes.

15 Claims, 6 Drawing Sheets

(56) References Cited

OTHER PUBLICATIONS

International Search Report for PCT/US2009/062516 dated Feb. 12, 2010.
International Search Report for PCT/US2010/055204 dated Mar. 3, 2011.
International Search Report for PCT/US2011/052504 Dated Dec. 28, 2011.
International Search Report for PCT/US2011/058877 Dated Feb. 8, 2012.
Jirsa, F., et al. "Studien uber hohere Silberoxyde", Z. Anorg Undallg. Chemie, vol. 158, Dec. 31, 1926, pp. 61-66.
Kendall, James, et al., "The Catalytic Influence of Foreign Oxides on the Decomposition of Silver Oxide, Mercuric Oxide and Barium Peroxide", Department of Organic Chemistry, Columbia University, No. 373, 1921, pp. 2017-2031.
McMillan, J. A., "Higher Oxidation States of Silver", Argonne National Laboratory, Jul. 28, 1961, pp. 65-80.
International Search Report for PCT/US2013/061834 dated Feb. 26, 2014.

* cited by examiner

CATHODE ACTIVE MATERIAL (HIGHER OXIDES OF SILVER)

CROSS REFERENCE TO RELATED APPLICATIONS

This patent application claims the benefit of PCT patent application serial no. PCT/US2009/062516, which was filed on Oct. 29, 2009, and claims priority to U.S. provisional patent application Ser. No. 61/109,312, which was filed on Oct. 29, 2008. The entire contents of these applications are incorporated by reference herein.

FIELD OF THE INVENTION

This invention is concerned with electric storage batteries, and in particular, with cathode active materials for alkaline batteries and methods of making the same.

BACKGROUND

When a traditional battery is discharged, the anode supplies positive ions to an electrolyte and electrons to an external circuit. The cathode is typically an electronically conducting host into which positive ions are inserted reversibly from the electrolyte as a guest species and are charge-compensated by electrons from the external circuit. A secondary battery, or cell, uses a reaction that can be reversed when current is applied to the battery, thus "recharging" the battery. The chemical reactions at the anode and cathode of a secondary battery must be reversible. On charge, the removal of electrons from the cathode by an external field releases positive ions back to the electrolyte to restore the parent host structure, and the addition of electrons to the anode by the external field attracts charge-compensating positive ions back into the anode to restore it to its original composition.

Traditional electrode materials such as cathode active materials suffer a number of drawbacks. For instance, many traditional cathodes possess an elevated impedance or internal ion resistance that negatively effects battery discharge, and thus, restricts battery performance. As many traditional batteries progress through charge cycles, the deleterious effect of impedance causes an increased hindrance on battery performance.

Thus, there is a need for electrode materials that have improved properties and can improve battery performance.

SUMMARY OF THE INVENTION

The present invention provides a method of producing cathode active material comprising providing a silver compound, wherein the silver of the compound has +1 oxidation state, mixing the silver compound with a solvent to form a mixture, and oxidizing the silver of
the silver compound with ozone to generate a silver oxide wherein the silver of the silver oxide has an oxidation state of +2 or more and an ionic conductivity of less than about 10 microOhms.

Some silver compounds useful in the present method silver compound are substantially soluble the solvent. In several examples, the silver compound comprises Ag—X, wherein X is a counter anion. Exemplary counter anions include hydride, nitrate, fluoride, nitrite, chloride, perchlorate, bromide, chlorate, iodide, chlorite, cyanide, hypochlorite, cyanate, iodate, thiocyanate, bromate, hydroxide, hypobromite, amide, permanganate, acetate, dihydrogen phosphate, formate, hydrogen sulfate, hydrogen carbonate or bicarbonate, periodate, iodate, perbromate, hexafluorophosphate, tetrafluoro borate, azide, aluminate, hydrogen sulfide, hexafluoroarsinate, bromite, iodite, metaborate, hydrogen carbide, or any combination thereof. In several methods, the silver compound comprises silver nitrate.

The mixing of the silver compound with the solvent is tolerant of a broad spectrum of reaction conditions. For instance, the silver compound is mixed with the solvent at a temperature of from about 10° C. to about 60° C. to form the mixture, which in several embodiments is substantially liquid. Furthermore, the silver compound can be mixed with solvent under stirring or other processing.

Solvents useful in the methods of the present invention include those solvents and/or solvent systems that can substantially dissolve one or more silver compounds. Several exemplary solvents are liquid at room temperature and ambient pressure. Other solvents include an aqueous solvent system. For instance, the solvent includes an aqueous solvent system having a pH of less than about 8. Other solvents include an aqueous solvent system that comprises at least about 95 wt % water by weight of the solvent.

The ozone is diffused through the mixture at a rate of at least about 3 g per hour. The method of the present invention is also tolerant of many different diffusion rates for ozone. In other examples, the ozone is diffused through the mixture at a rate of at least 10 g per hour, at least 20 g per hour, or at least 30 g per hour. The ozone oxidizes the silver in solution and generates a silver oxide such as AgO, $Ag_2O_3$, or a combination thereof. The resultant silver oxide has an ionic conductivity of less than about 10 microOhms, less than about 5 microOhms, or less than about 1 microOhms.

The method of the present invention can also include optional steps or processes such as drying the silver oxide, doping the silver oxide, purifying the silver oxide, or any combination thereof. In several examples the resultant silver oxide is dried at a pressure of less than about 0.5 atm. In other examples, the silver oxide is dried at a temperature of at least 30° C. In still other examples, the silver oxide is doped with a lead compound.

Figure 1:
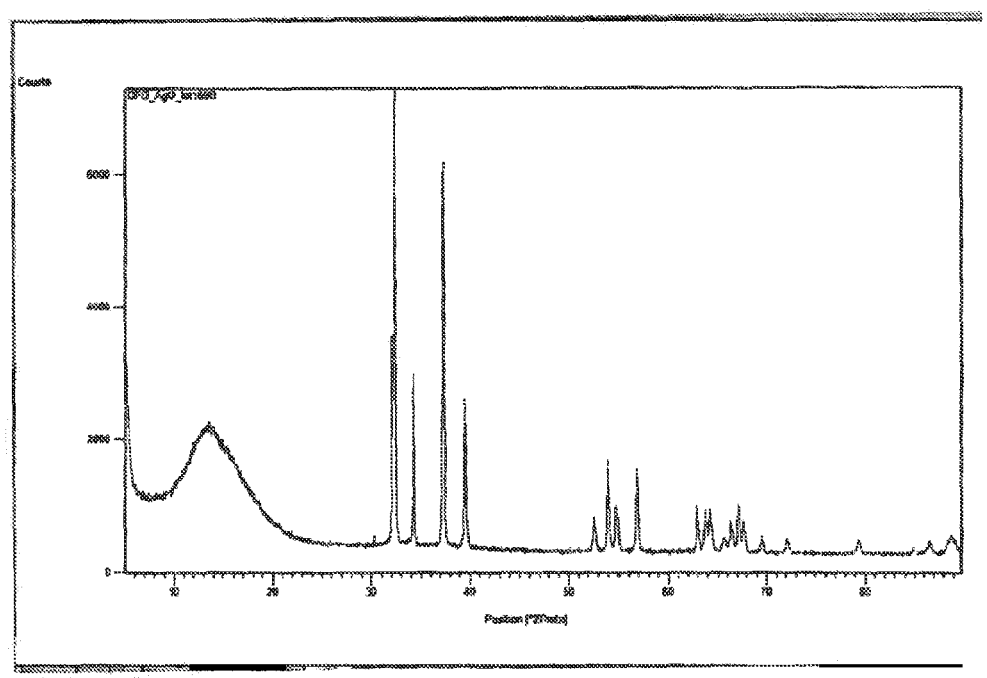
FIG. 1 is a graphical representation of the diffractometry data of a AgO powder standard.

These figures are by way of example and are not intended to limit the scope of the present invention.

DETAILED DESCRIPTION

The present invention provides a method of producing a cathode active material comprising providing a silver compound, wherein the silver of the silver compound has an oxidation state of +1, mixing the silver compound with a solvent to form a mixture, oxidizing the silver of the compound with ozone to generate a silver oxide wherein the silver oxide has a higher oxidation number of +2 or greater and has an ionic conductivity of less than about 10 microOhms. This cathode active material is useful in cathodes for electrochemical cells such as those employed in alkaline batteries.

I. DEFINITIONS

The term "battery" encompasses electrical storage devices comprising one electrochemical cell or a plurality of electrochemical cells. A "secondary battery" is rechargeable, whereas a "primary battery" is not rechargeable. For secondary batteries of the present invention, a battery anode is designated as the positive electrode during discharge, and as the negative electrode during charge.

The term "silver oxide" or "silver oxide powder" refers to any silver oxide compound such as $AgO$, $Ag_2O$, $Ag_2O_3$, or any combination thereof.

As used herein, "silver compound" refers to an Ag—X species, wherein silver has an oxidation state of +1, and the X term is a counter anion having a −1 formal charge, such as hydride ($H^-$), nitrate ($NO_3^-$), fluoride ($F^-$), nitrite ($NO_2^-$), chloride ($Cl^-$), perchlorate ($ClO_4^-$), bromide ($Br^-$), chlorate ($ClO_3^-$), iodide ($I^-$), chlorite ($ClO_2^-$), cyanide ($CN^-$), hypochlorite ($OCl^-$), cyanate ($OCN^-$), iodate ($IO_3^-$), thiocyanate ($SCN^-$), bromate ($BrO_3^-$), hydroxide ($OH^-$), hypobromite ($OBr^-$), amide ($NH_2^-$), permanganate ($MnO_4^-$), acetate ($CH_3COO^-$), dihydrogen phosphate ($H_2PO_4^-$), formate ($HCOO^-$), hydrogen sulfate ($HSO_4^-$), hydrogen carbonate or bicarbonate ($HCO_3^-$), periodate ($IO_4^-$), iodate ($IO_3$), perbromate ($BrO_4$), hexafluorophosphate ($PF_6$), tetrafluoro borate ($BF_4$), azide ($N_3$), aluminate ($AlO_2$), hydrogen sulfide (HS), hexafluoroarsinate ($AsF_6$), bromite ($BrO_2$), iodite ($IO_2$), metaborate ($BO_2$), or hydrogen carbide ($HC_2$). Furthermore, 'silver compound' also refers to mixtures of different Ag—X species, wherein each Ag—X is independently defined above.

The term "alkaline battery" refers to a primary battery or a secondary battery, wherein the primary or secondary battery comprises an alkaline electrolyte.

As used herein, a "dopant" or "doping agent" refers to a chemical compound that is added to a substance in low concentrations in order to alter the optical/electrical properties of the semiconductor. For example, a dopant may be added to the powder active material of a cathode to improve its electronic properties (e.g., reduce its impedance and/or resistivity).

As used herein, an "electrolyte" refers to a substance that behaves as an electrically conductive medium. For example, the electrolyte facilitates the mobilization of electrons and cations in the cell. Electrolytes include mixtures of materials such as aqueous solutions of alkaline agents. Some electrolytes also comprise additives such as buffers. For example, an electrolyte comprises a buffer comprising a borate or a phosphate. Exemplary electrolytes include, without limitation, aqueous KOH, aqueous NaOH, or the liquid mixture of KOH in a polymer.

As used herein, "alkaline agent" refers to a base or ionic salt of an alkali metal (e.g., an aqueous hydroxide of an alkali metal). Furthermore, an alkaline agent forms hydroxide ions when dissolved in water or other polar solvents. Exemplary alkaline electrolytes include without limitation LiOH, NaOH, KOH, CsOH, RbOH, or combinations thereof. Electrolytes can optionally include other salts to modify the total ionic strength of the electrolyte, for example KF or $Ca(OH)_2$.

As used herein, an "anode" is an electrode through which (positive) electric current flows into a polarized electrical device. In a battery or galvanic cell, the anode is the negative electrode from which electrons flow during the discharging phase in the battery. The anode is also the electrode that undergoes chemical oxidation during the discharging phase. However, in secondary, or rechargeable, cells, the anode is the electrode that undergoes chemical reduction during the cell's charging phase. Anodes are formed from electrically conductive or semiconductive materials, e.g., metals, metal oxides, metal alloys, metal composites, semiconductors, or the like. Common anode materials include Si, Sn, Al, Ti, Mg, Fe, Bi, Zn, Sb, Ni, Pb, Li, Zr, Hg, Cd, Cu, $LiC_6$, mischmetals, alloys thereof, oxides thereof, or composites thereof. Anode materials such as zinc may even be sintered.

Anodes may have many configurations. For example, an anode may be configured from a conductive mesh or grid that is coated with one or more anode materials. In another example, an anode may be a solid sheet or bar of anode material.

As used herein, a "cathode" is an electrode from which (positive) electric current flows out of a polarized electrical device. In a battery or galvanic cell, the cathode is the positive electrode into which electrons flow during the discharging phase in the battery. The cathode is also the electrode that undergoes chemical reduction during the discharging phase. However, in secondary or rechargeable cells, the cathode is the electrode that undergoes chemical oxidation during the cell's charging phase. Cathodes are formed from electrically conductive or semiconductive materials, e.g., metals, metal oxides, metal alloys, metal composites, semiconductors, or the like. Common cathode materials include $Ag_2O_3$, $Ag_2O$, HgO, $Hg_2O$, CuO, CdO, NiOOH, $Pb_2O_4$, $PbO_2$, $LiFePO_4$, $Li_3V_2(PO_4)_3$, $V_6O_{13}$, $V_2O_5$, $Fe_3O_4$, $Fe_2O_3$, $MnO_2$, $LiCoO_2$, $LiNiO_2$, $LiMn_2O_4$, or composites thereof. Cathode materials such as $Ag_2O_3$ may even be sintered.

Cathodes may also have many configurations. For example, a cathode may be configured from a conductive mesh that is coated with one or more cathode materials. In another example, a cathode may be a solid sheet or bar of cathode material.

As used herein, an "electronic device" is any device that is powered by electricity. For example, and electronic device can include a portable computer, a portable music player, a cellular phone, a portable video player, or any device that combines the operational features thereof.

The symbol "M" denotes molar concentration.

Batteries and battery electrodes are denoted with respect to the active materials in the fully-charged state. For example, a zinc-silver battery comprises an anode comprising zinc and a cathode comprising a silver powder (e.g., $Ag_2O_3$). Nonetheless, more than one species is present at a battery electrode under most conditions. For example, a zinc electrode generally comprises zinc metal and zinc oxide (except when fully charged), and a silver powder electrode usually comprises AgO, $Ag_2O_3$ and/or $Ag_2O$ and silver metal (except when fully discharged).

The term "oxide" applied to alkaline batteries and alkaline battery electrodes encompasses corresponding "hydroxide" species, which are typically present, at least under some conditions.

As used herein "substantially stable" or "substantially inert" refers to a compound or component that remains substantially chemically unchanged in the presence of an alkaline electrolyte (e.g., potassium hydroxide) and/or in the presence of an oxidizing agent (e.g., silver ions present in the cathode or dissolved in the electrolyte).

As used herein, "charge profile" refers to a graph of an electrochemical cell's voltage or capacity with time. A charge profile can be superimposed on other graphs such as those including data points such as charge cycles or the like.

As used herein, "resistivity" or "impedance" refers to the internal resistance of a cathode in an electrochemical cell. This property is typically expressed in units of Ohms or micro-Ohms.

As used herein, the terms "first" and/or "second" do not refer to order or denote relative positions in space or time, but these terms are used to distinguish between two different elements or components. For example, a first separator does not necessarily proceed a second separator in time or space; however, the first separator is not the second separator and vice versa. Although it is possible for a first separator to precede a second separator in space or time, it is equally possible that a second separator precedes a first separator in space or time.

II. METHODS OF PRODUCING CATHODE ACTIVE MATERIAL

The present invention provides a method of producing a cathode active material that comprises providing a silver compound wherein the silver of the silver compound has an oxidation state of +1, mixing the silver compound with a solvent, and oxidizing the silver of the compound with ozone to generate a silver oxide having an oxidation state of greater than +1.

In one embodiment, the method of producing cathode active material comprises providing a silver compound, wherein the silver of the compound has +1 oxidation state; dissolving the silver compound in a solvent to form a mixture (e.g., a solution); and oxidizing the silver of the silver compound with ozone to generate a silver oxide wherein the silver oxide has an oxidation state of +2 or more and an ionic conductivity of less than about 10 microOhms.

Silver compounds useful in the present method include any suitable silver compound or combination of silver compounds that is oxidizable by ozone in solution to generate a silver oxide wherein the silver of the silver oxide has an oxidation state of +2 or more. In several embodiments, the silver compound is substantially soluble in aqueous solvents. For instance, the silver compound is substantially soluble in an aqueous solvent at a temperature of from about 10° C. to about 60° C. at ambient pressure. In other instances, the silver compound is substantially soluble in an aqueous solvent having a pH of about 8 or less at a temperature of from about 10° C. to about 60° C. at ambient pressure.

In one embodiment, the silver compound comprises Ag—X, wherein X is a counter anion. Exemplary counter anions include hydride, nitrate, fluoride, nitrite, chloride, perchlorate, bromide, chlorate, iodide, chlorite, cyanide, hypochlorite, cyanate, iodate, thiocyanate, bromate, hydroxide, hypobromite, amide, permanganate, acetate, dihydrogen phosphate, formate, hydrogen sulfate, hydrogen carbonate or bicarbonate, periodate, iodate, perbromate, hexafluorophosphate, tetrafluoro borate, azide, aluminate, hydrogen sulfide, hexafluoroarsinate, bromite, iodite, metaborate, hydrogen carbide, or any combination thereof.

In one embodiment, the silver compound comprises silver nitrate. For example, the silver compound comprises at least about 90 wt % (e.g., at least about 95 wt % or at least about 99 wt %) silver nitrate, by weight of the silver compound.

In the method of the present invention, the silver compound substantially dissolves in a solvent to form a mixture (e.g., a solution) under any reaction conditions that do not sufficiently interfere with silver oxidation by ozone. In one embodiment, the silver compound is dissolved in the solvent at a temperature of from about 10° C. to about 45° C. to form the mixture. In another embodiment, the silver compound is dissolved in the solvent at room temperature to form the mixture.

To aid in the dissolution of the silver compound, the silver can be dissolved in the solvent under mixing or stirring. For instance, the silver compound can be added to the solvent under stirring with a stir bar. Mixing or stirring can be performed concurrently with the addition of the silver compound to the solvent, after the addition of the silver compound to the solvent, or both.

Once the silver is dissolved in the solvent to form a mixture or solution, the resulting mixture or solution is substantially liquid.

Solvents useful in the method of the present invention include any suitable solvent that dissolves a silver compound and does not substantially interfere with the oxidation of the silver of the silver compound by ozone. In several embodiments, the solvent is liquid at room temperature and under ambient pressure. In other embodiments, the solvent is an aqueous solvent system. For instance, the solvent is an aqueous solvent system having a pH of less than about 8. In another example, the aqueous solvent system comprises at least about 95 wt % (e.g., at least about 97 wt % or at least about 99 wt %) water by weight of the solvent. In other examples the solvent is distilled water.

Ozone is added to the mixture to oxidize the dissolved silver of the silver compound for a duration sufficient to oxidize at least some of the silver of the silver compound to generate a silver oxide wherein the silver of the silver oxide has an oxidation state of greater than +1 (e.g., 2 or 3). In several embodiments, ozone is diffused through the mixture at a rate of at least about 3 g per hour for a duration of at least 10 hours (e.g., at least about 10 g per hour for a duration of at least 10 hours, at least about 20 g per hour for a duration of at least 10 hours, or about 30 g per hour for a duration of at least 20 hours).

The silver oxide generated according to the method of the present invention has an oxidation state of greater than +1. For example, the silver oxide comprises AgO (oxidation state of silver is +2), $Ag_2O_3$ (oxidation state of silver is +3), or a combination thereof. In another example, the silver oxide comprises at least 80 wt % (e.g., at least 90 wt %, at least 95 wt %, or at least 99 wt %) of $Ag_2O_3$, by weight of the silver oxide. Furthermore, silver oxides generated according the method of the present invention have an ionic conductivity of less than about 5 microOhms (e.g., less than about 1 microOhms).

The methods of the present invention can optionally comprise additional steps wherein the silver oxide undergoes further processing (e.g., drying, purification, doping, any combination thereof, or the like). For instance, the silver oxide is dried. In other examples, the silver oxide is dried under reduced pressure, i.e., less than ambient pressure. For instance, the silver oxide is dried under a pressure of less than about 0.5 atm. In other instances, the silver oxide is dried under a pressure approximating a vacuum. Furthermore, the silver oxide can also be dried at an elevated temperature, i.e., a temperature above the ambient temperature. For example, the silver oxide is dried at a temperature of at least 30° C. (e.g., at least 40° C., at least 45° C., or about 50° C.). In another example, the silver oxide is dried in a vacuum drier under a pressure of less than about 0.5 atm and a temperature of about 50° C.

In other embodiment, the method of the present invention comprises doping the silver oxide with a lead compound, a gallium compound, a germanium compound, or a tellurium compound. In some embodiment, the method of the present invention comprises doping the silver oxide with a lead compound. In several examples, the doping agent is an organic lead compound. For instance, the dopant is lead acetate, or another lead compound (e.g., lead nitrate) wherein the Pb atom complexes with other suitable organic compounds that are substantially stable in a silver ion environment.

The doped silver oxide compound can be formed into a cathode wherein the silver oxide in the cathode comprises a sufficient amount of dopant such that the resistivity of the cathode is about 15 Ohm·cm or less (e.g., about 10 Ohm·cm or less, about 9 Ohm·cm or less, about 8 Ohm·cm or less, about 6 Ohm·cm or less, about 5 Ohm·cm or less or about 3 Ohm·cm or less). For example, the cathode comprises from about 1 wt % to about 10 wt % (e.g., from about 1 wt % to about 10 wt %, from about 1.1 wt % to about 7 wt %, from about 1.5 wt % to about 6 wt %, or from about 2 wt % to about 5 wt %) of an organic lead compound such as lead acetate and/or lead nitrate.

In alternative embodiments, the doped silver oxide comprises a powder that is comprised of particles having a suitable size. In some examples, the doped silver oxide powder has a mean particle diameter of 60 µm or less (e.g., 55 µm or less, 45 µm or less, or 35 µm or less).

In other embodiments, where the doped silver oxide powder is also coated with a dopant and formed into a cathode. In some examples, the silver oxide powder is doped with a first lead compound (e.g., lead acetate or lead nitrate) and coated with a second lead compound (lead oxide, lead acetate, or lead nitrate). In other examples, the silver oxide powder is doped and coated with the same lead compound (e.g., lead acetate, lead oxide, and/or lead nitrate).

In some examples, the silver oxide powder is formed into a cathode wherein the silver oxide powder is coated with an amount of a lead compound (e.g., lead oxide, lead nitrate, lead acetate, or any combination thereof) sufficient to impart the cathode with a resistivity of less than about 9 Ohm·cm (e.g., less than about 5 Ohm·cm, less than about 4.5 Ohm·cm, less than about 4 Ohm·cm, or less than about 3.5 Ohm·cm).

In some embodiments, doped silver oxide powder is formed into a cathode wherein the silver oxide is coated with an amount of the lead compound (e.g., lead acetate) sufficient to provide the silver oxide powder with a mean particle diameter of about 10 µm or less (e.g., about 6 µm or less, about 5 µm or less, about 4 µm or less, or about 3 µm or less).

In alternative embodiments, the doped silver oxide powder is formed into a cathode, wherein the silver oxide powder is coated with from about 1 wt % to about 5 wt % of lead acetate.

Cathodes formed from silver oxide provided using methods of the present invention can optionally comprise additives such as binders, current collectors, or the like. In several examples, the cathode comprises a binder. For instance, the cathode comprises a binder, and the binder comprises PTFE, PVDF (e.g., PVDF-co-HFP), CMC, PVP, PAA, or a copolymer thereof. In other examples, the cathode comprises PFTE binder.

III. EXAMPLES

The following materials were used to produce cathode active material according to an exemplary method of the present invention.

Example No. 1

Materials

Silver nitrate ($AgNO_3$): A.C.S. grade, from D.F. Goldsmith Chemical & Metal Corp.;
AgO powder: A.C.S. grade, from D.F. Goldsmith Chemical & Metal Corp. (lot no. 169B); and
DI water.

A 2000 ml flat bottom cylinder flask was placed into a hot water bath and a stir bar was added to the flask. 150 g of $AgNO_3$ and 1600 g of DI water were added to the reaction flask and stirred vigorously. The flask was heated to 40° C. under vigorous stirring, and the $AgNO_3$ readily dissolved in the DI water. Ozone was generated using Guardian model PB30S1-C plasma block ozone system set to a maximum flow of 30 g/hr of ozone, and ozone was dispersed throughout the reaction mixture in the 2000 mL flask using a gas dispersion tube for a period of 34.5 hours during which time, precipitants formed.

Stirring was arrested, the precipitants in the reaction flask settled, and the water was decanted. The ionic conductivity of the precipitants was measured using a YSI 3100 Conductivity Instrument. The precipitants were rinsed with DI water, which was decanted once the precipitants settled again. The rinse and decant process was repeated until the ion conductivity measured below 1 microOhm.

The precipitants were filtered and dried in at 60° C. in a vacuum oven to generate a dry powder.

The particle size of the dry powder was analyzed using a Horiba LA-930 particle size analyzer, which generated the following particle size distribution data:

|    |     | (µm)  |
|----|-----|-------|
| 5  | (%) | 3.46  |
| 10 | (%) | 4.15  |
| 20 | (%) | 5.05  |
| 30 | (%) | 5.71  |
| 40 | (%) | 6.31  |
| 50 | (%) | 6.92  |
| 70 | (%) | 8.26  |
| 80 | (%) | 9.15  |
| 90 | (%) | 10.59 |
| 95 | (%) | 11.85 |

Figure 2:
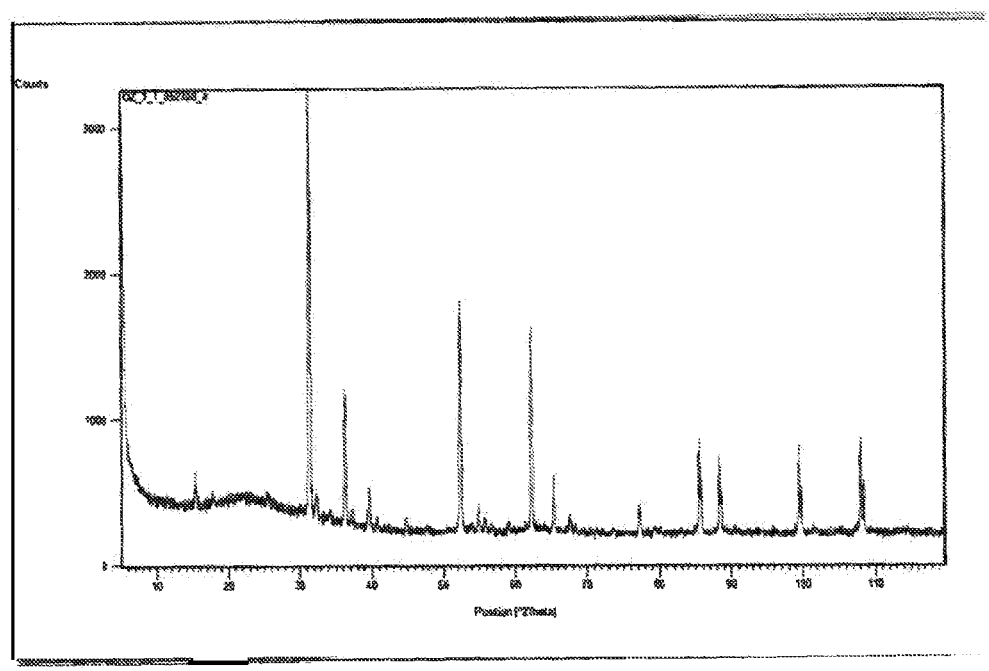
FIG. 2 is a graphical representation of the diffractometry data of an experimental silver oxide powder that was generated using an exemplary method of the present invention.

A Phillips Xpert Diffractometer was used to analyze the structure of the resulting experimental powder against a AgO standard. Graphical representations of diffractometry data for the AgO standard and the experimental powder are provided in FIGS. 1 and 2, respectively. A comparison of these diffractometries demonstrates that about 95% or more of the powder was cubic $Ag_2O_3$, and about 5% or less of the powder was monoclinic AgO.

Figure 3:
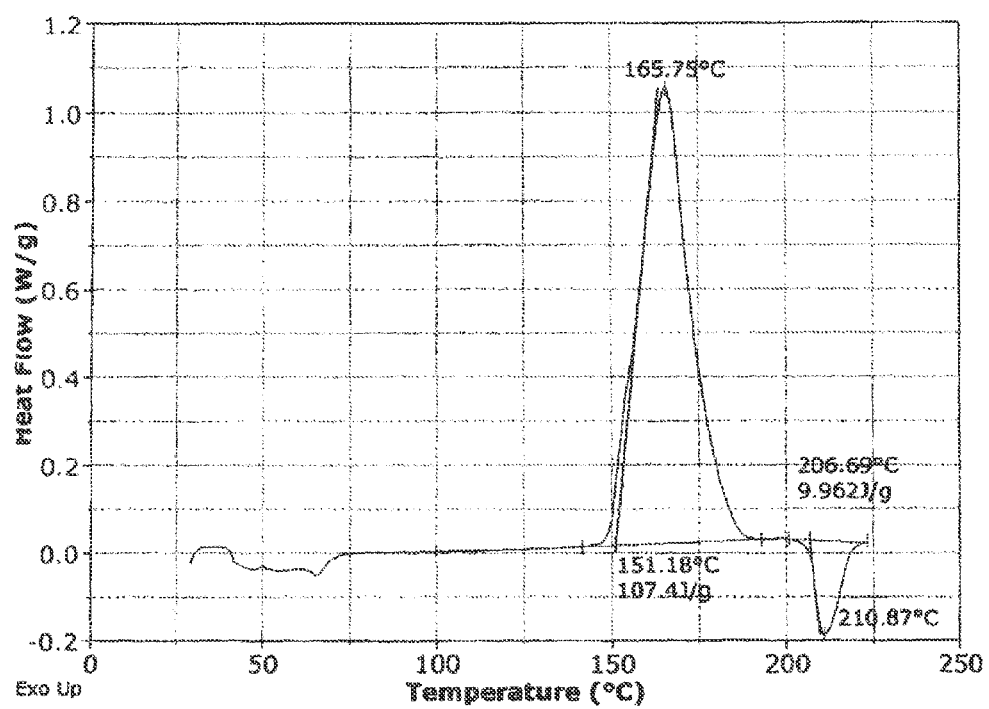
FIG. 3 is a graphical representation of the data from a thermal analysis of an experimental silver oxide powder that was generated using an exemplary method of the present invention.
Figure 4:
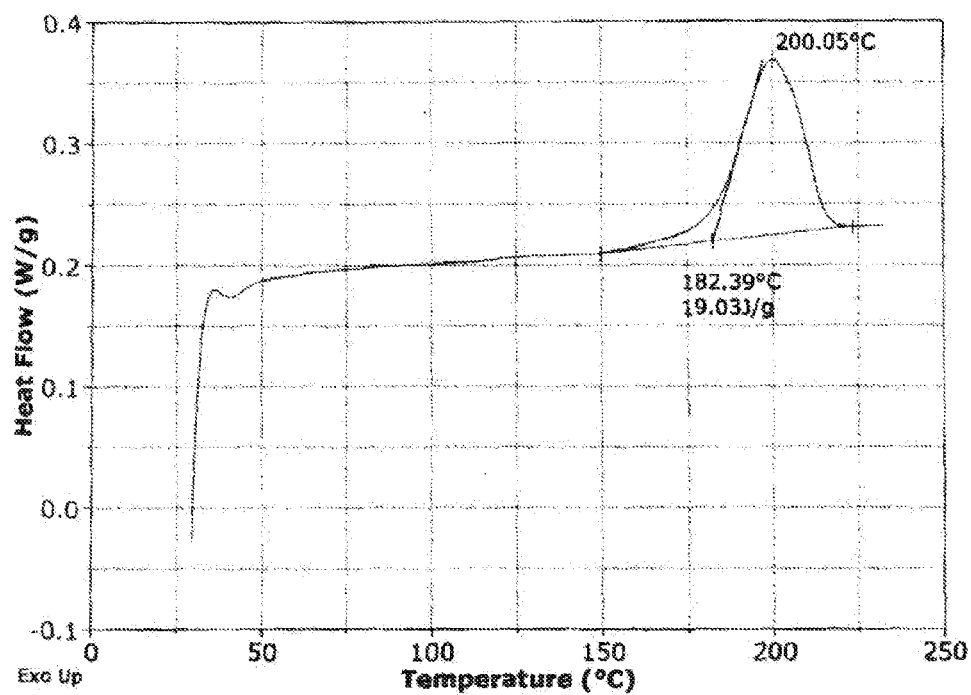
FIG. 4 is a graphical representation of the data from a thermal analysis of a AgO powder standard.

A thermal analysis of 34.2 mg of experimental powder was performed using a TA Instruments DSC 2920 and 18.8 mg of AgO powder standard. Graphical representations of the thermal analysis data for the experimental powder and the AgO powder standard are provided in FIGS. 3 and 4, respectively. From the data, the thermal analysis of the experimental powder generated an exothermal peak at about 166° C., representing the thermal decomposition temperature of the experimental powder, and an endothermal peak at about 211° C.; whereas the thermal analysis of the AgO powder standard generated only an exothermal peak at about 200° C., representing the thermal decomposition temperature of the AgO powder standard.

Example No. 2

The electrochemical properties of cathode active material were tested using galvanostatic techniques wherein cathode active material, produced according to the procedures of Example 1, was formed into an electrode by mixing the cathode active material with acidic PFTE dispersion under low speeds in a Dual Asymmetric Centrifuge speed mixer. The resulting material was rolled to a thickness of about 0.57", baked on a glass tray in a 60° C. vacuum oven under 25 psi for about 3.5 hours, and then pressed onto a current collector.

Figure 5:
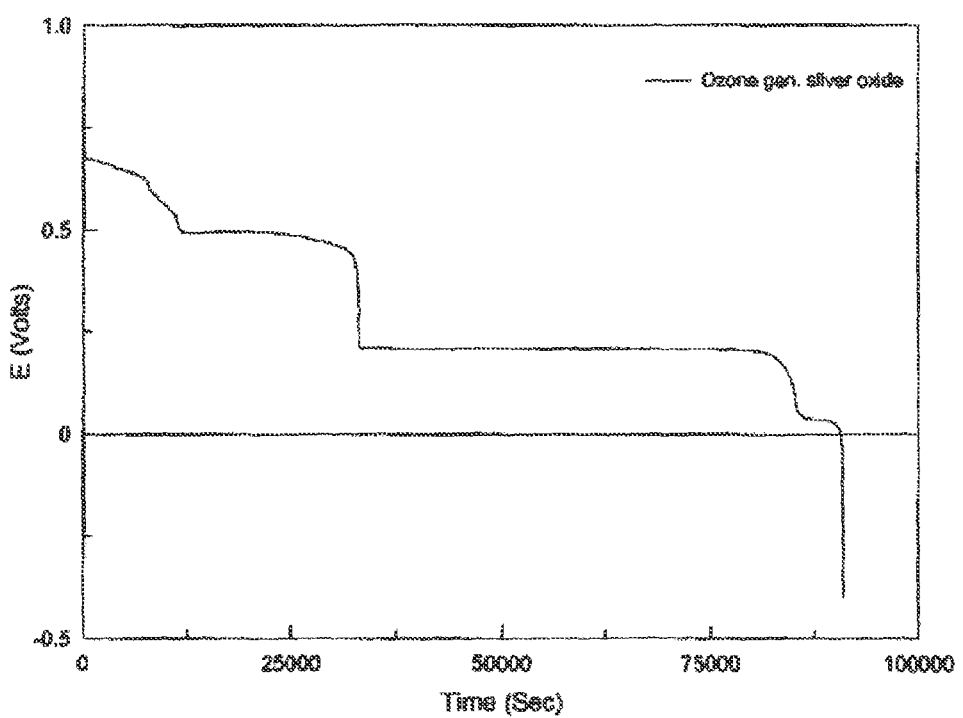
FIG. 5 is a graphical representation of the data from a galvanostatic discharge analysis of cathode active material produced according to a method of the present invention.

The galvanostatic discharge of this electrode was tested in a solution of KOH (1.4 g/mL) that was saturated with PbO and a discharge at −0.1667 Amps and compared to the galvanostatic discharge of an Hg/HgO electrode standard. The discharge data for the cathode active material electrode is presented graphically in FIG. 5, which shows a plateau at 0.6 V, which was not present in the Hg/HgO reference cathode. This indicates the presence of a silver oxide having an oxidation state higher than that of divalent silver oxide.

Example No. 3

Figure 6:
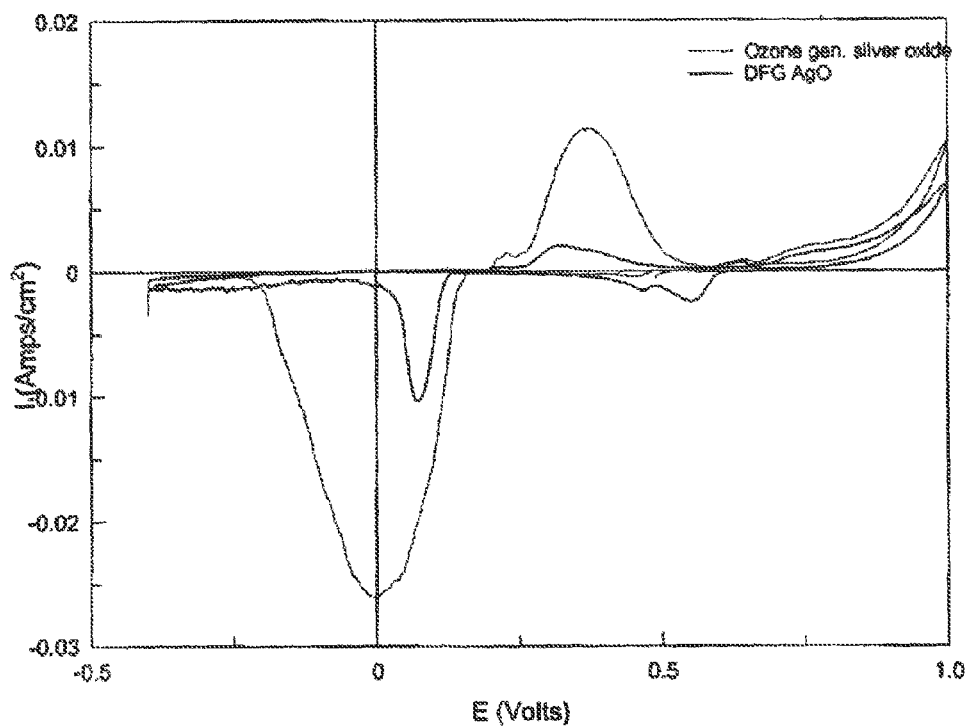
FIG. 6 is a graphical representation of the data from cyclic voltammetry analysis of a cathode active material produced according to a method of the present invention.

The electrochemical properties of cathode active material were also tested using cyclic voltammetry, wherein an electrode was fashioned from cathode active material produced according to the procedure of Examples 1 and formed into a cathode according to the procedure of Example 2. The cyclic voltammetry data, graphically presented in FIG. 6, shows a transition peak during the negative scan (5 mV/sec) at 0.6V, which was not present in the testing of the cyclic voltammetry of an AgO standard electrode. This transition peak confirms that the cathode active material comprises silver oxide having an oxidation number greater than +2.

OTHER EMBODIMENTS

All publications and patents referred to in this disclosure are incorporated herein by reference to the same extent as if each individual publication or patent application were specifically and individually indicated to be incorporated by reference. Should the meaning of the terms in any of the patents or publications incorporated by reference conflict with the meaning of the terms used in this disclosure, the meaning of the terms in this disclosure are intended to be controlling. Furthermore, the foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. A method of producing cathode active material comprising:
    providing a silver compound, wherein the silver of the compound has +1 oxidation state;
    dissolving the silver compound in a solvent comprising at least about 95% water by weight to form a mixture; and
    oxidizing the silver of the silver compound with ozone to generate a silver oxide, wherein the silver of the silver oxide has an oxidation state of +2 or more and wherein the silver oxide comprises at least 95 wt % of $Ag_2O_3$.

2. The method of claim 1, wherein the silver compound comprises Ag—X, wherein X is a counter anion.

3. The method of claim 2, wherein counter anion is hydride, nitrate, fluoride, nitrite, chloride, perchlorate, bromide, chlorate, iodide, chlorite, cyanide, hypochlorite, cyanate, iodate, thiocyanate, bromate, hydroxide, hypobromite, amide, permanganate, acetate, dihydrogen phosphate, formate, hydrogen sulfate, hydrogen carbonate or bicarbonate, periodate, iodate, perbromate, hexafluorophosphate, tetrafluoro borate, azide, aluminate, hydrogen sulfide, hexafluoroarsinate, bromite, iodite, metaborate, hydrogen carbide, or any combination thereof.

4. The method of claim 3, wherein the silver compound comprises silver nitrate.

5. The method of claim 1, wherein the silver compound is dissolved in the solvent at a temperature of from about 10° C. to about 60° C. to form the mixture.

6. The method of claim 5, wherein the mixture is substantially liquid.

7. The method of claim 6, wherein the silver compound is dissolved under stirring.

8. The method of claim 1, wherein the solvent has a pH of less than about 8.

9. The method of claim 1, wherein the ozone is diffused through the mixture at a rate of at least about 3 g per hour.

10. The method of claim 1, wherein the silver oxide has an ionic conductivity of less than about 5 microOhms.

11. The method of claim 10, wherein the silver oxide has an ionic conductivity of less than about 1 microOhms.

12. The method of claim 11, further comprising drying the silver oxide.

13. The method of claim 12, wherein the silver oxide is dried in an environment having a pressure of less than about 0.5 atm.

14. The method of claim 13, wherein the silver oxide is dried at a temperature of at least about 30° C.

15. A method of producing cathode active material comprising:
    providing a silver compound, wherein the silver of the compound comprises silver nitrate;
    dissolving the silver compound in an aqueous solvent comprising at least about 95% water by weight to form a mixture at a temperature and pressure wherein the aqueous solvent is liquid; and
    diffusing ozone through the mixture to generate a silver oxide comprising $Ag_2O_3$.

* * * * *